J. HICKEY.
APPARATUS FOR HEATING WATER.
APPLICATION FILED APR. 29, 1911.
1,058,586.
Patented Apr. 8, 1913.
3 SHEETS—SHEET 1.
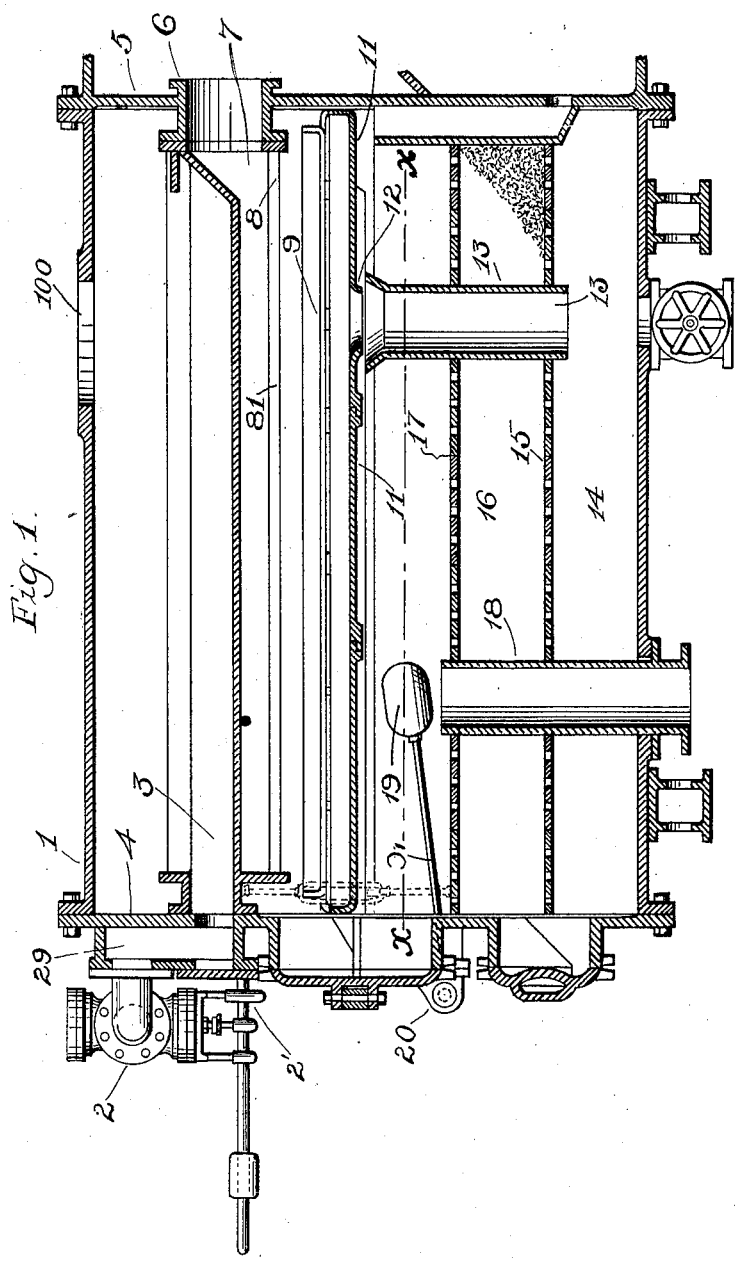
WITNESSES:
T. S. Coleman
Thomas Hewes
INVENTOR.
John Hickey
BY
Beach & Fish
ATTORNEYS.

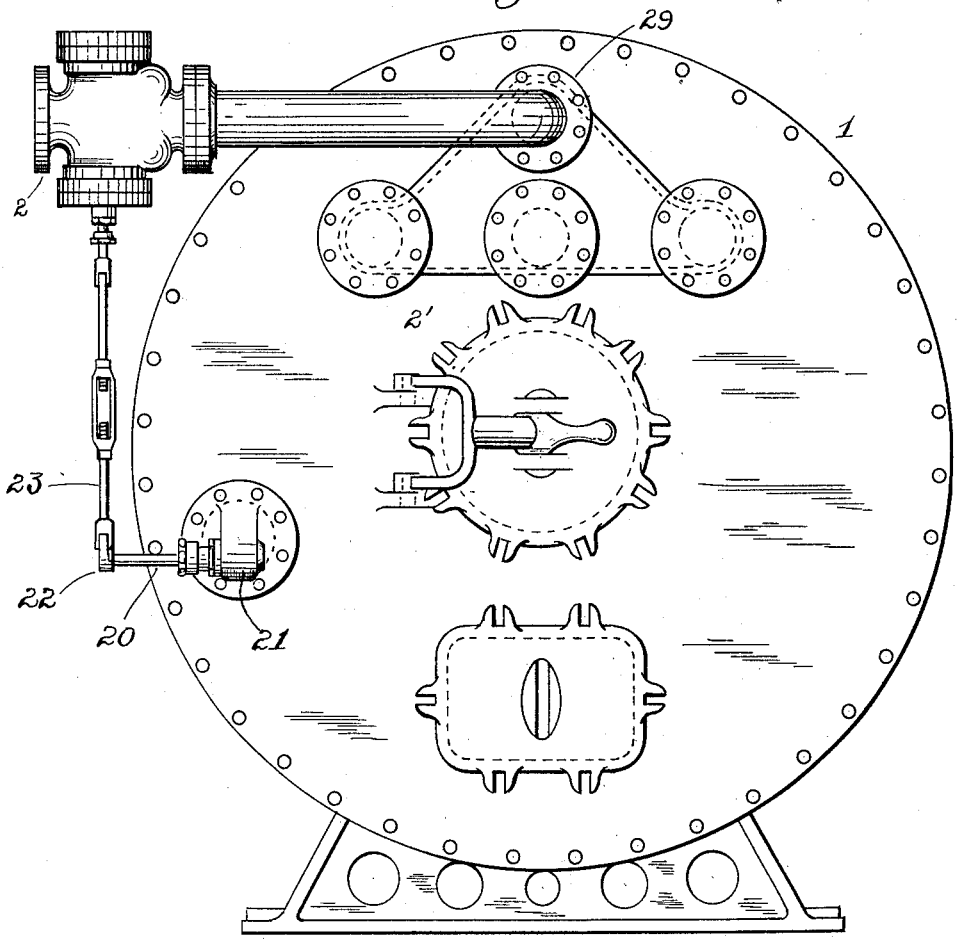
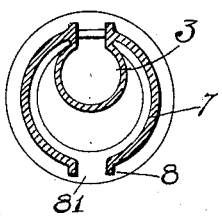

J. HICKEY.
APPARATUS FOR HEATING WATER.
APPLICATION FILED APR. 29, 1911.
1,058,586.
Patented Apr. 8, 1913.
3 SHEETS—SHEET 3.
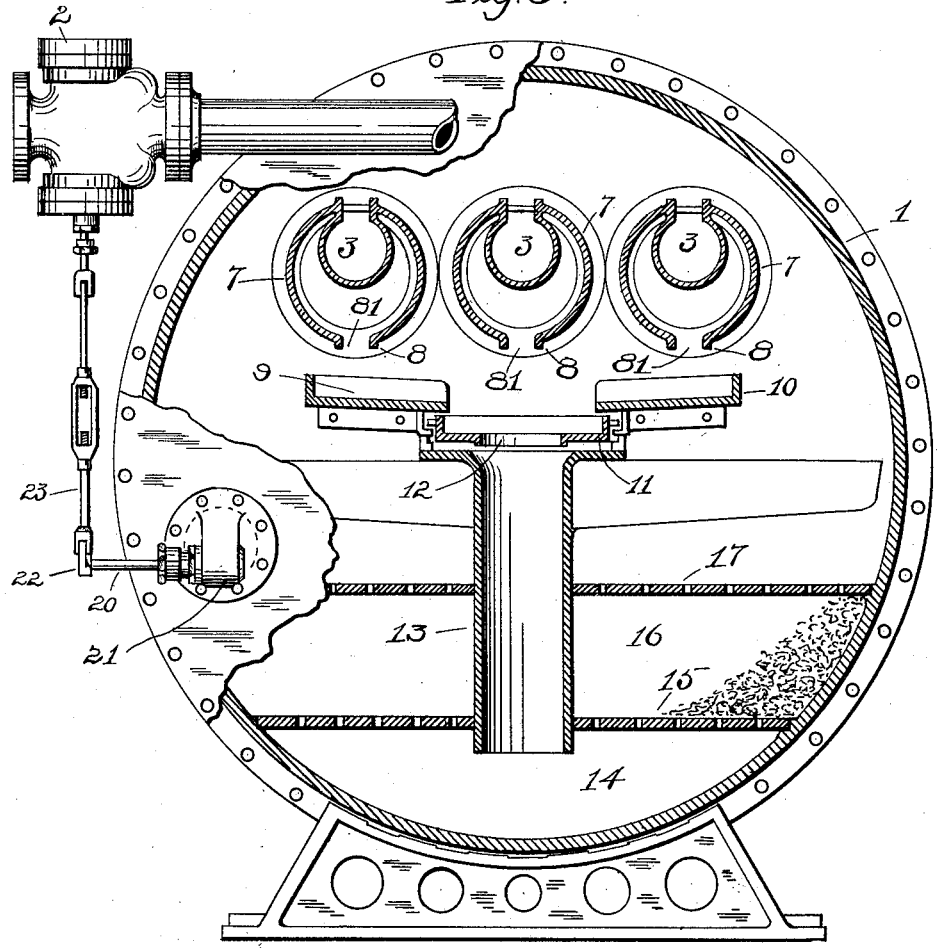
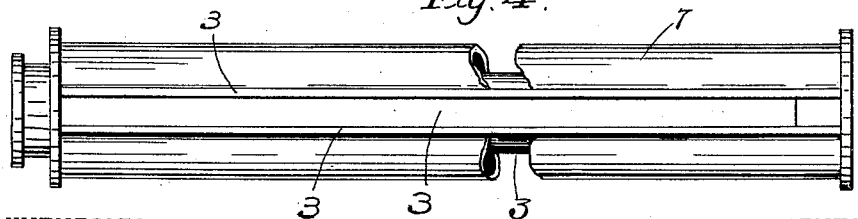
WITNESSES:
INVENTOR.
ATTORNEYS.

UNITED STATES PATENT OFFICE.

JOHN HICKEY, OF NEW HAVEN, CONNECTICUT, ASSIGNOR TO NATIONAL PIPE BENDING COMPANY, OF NEW HAVEN, CONNECTICUT, A CORPORATION OF CONNECTICUT.

APPARATUS FOR HEATING WATER.

1,058,586.      Specification of Letters Patent.      Patented Apr. 8, 1913.

Application filed April 29, 1911. Serial No. 624,138.

*To all whom it may concern:*

Be it known that I, JOHN HICKEY, of the city and county of New Haven and State of Connecticut, have invented new and useful Improvements in Apparatus for Heating Water, of which the following is a full, clear, and exact description when taken in connection with the accompanying drawings, which form a part thereof.

My invention relates to water heating apparatus primarily intended as a feed water heater for boilers, and the object of the invention is to obtain a thorough, rapid and economical heating of the water by means of a comparatively small quantity of steam as the water passes from the source of supply to the place of use.

To this end the invention consists in means for subjecting the water, in a series of successive stages of increasingly fine division, to the action of the heating medium, thereby bringing the water by gradual stages into the most direct and intimate contact with the heating medium which is possible, so that the heat is fully and quickly utilized.

The invention also comprises other improvements and combinations of parts hereinafter set forth and claimed.

In the accompanying drawings showing a preferred form of the invention, Figure 1 is a vertical longitudinal section of an apparatus embodying the invention, Fig. 2 is an enlarged end view, looking at the left end of the device of Fig. 1, Fig. 3 is a similar end view partly broken away and partly in section, Fig. 4 is a top view of one of the heating tubes or bodies, and Fig. 5 is a detail cross-section of one of the heating tubes or bodies.

Referring to the drawings, 1 is the shell of the heater, preferably cylindrical in form, with its longitudinal axis disposed horizontally. Into the upper part of this shell a supply of water is introduced through a regulating valve casing 2 mounted on the exterior of the shell and provided with a valve which is automatically regulated by the mechanism hereinafter described. The water enters a chamber 29 at one end of the heater and passes into the open tubes 3 forming parts of respective duplex pipe bodies which extend longitudinally of the heater, and are mounted at each end in suitable heads 4, 5. The steam for heating the water enters the heater at the opposite end through pipes 6, which communicate with a series of open tubes 7, each of which is partially occupied by a water feeding tube 3, which forms the other chamber of the duplex body. These tubular members 7 are closed at the top by said water tubes and are open at the bottom 81 to permit the escape therefrom of the stem fed through the pipe 6. The steam receiving tubular portions are closed at the water receiving end, and the water receiving portions are closed at the steam admitting end of the heater.

In the duplex feeding and heating body formed as described, the inner water receiving tubular portion is herein shown as formed of a reëntrant curved wall integral with the outer wall and extending within the chamber for the steam. This water carrying portion is preferably eccentric to the steam chamber.

The water entering the inner tubes 3 fills the same, and the main body of the water in the tubes is thus heated by the surrounding steam within the outer larger tubes 7. Thus the thin wall of each tube is used as a medium for the exchange of heat between the coldest water and the hottest steam. As the water continues to be fed into the heater, it will gradually overflow the edges of the water conducting tubes, passing down over the outer curved surfaces of the steam conducting tubes in a sheet or film, thus exposing the water while in the form of a thin layer to the highly heated outer surfaces of the steam conducting tubes, thereby bringing a comparatively small volume of water into contact with a large heated area, which has the effect of quickly raising the temperature of the water.

The steam conducting tubes are provided with downwardly projecting flanges 8 against which flanges the sheets of water overflowing from the water conducting tubes strike in their downward flow, thereby causing the water to be broken into fine spray as it is met by the steam emerging from the openings 81. The curved outside surface of the wall of the steam tube not only guides the sheets of water around the wall to the bottom edges thereof, but provides an abrupt intersection with the vertical edge flanges from which the water drops, thus insuring the disruption and spraying of the sheets of water. The steam from the conducting tubes in passing out of the lower openings 81 and meeting the sheets of water falling from each outer side of the steam conducting tubes, further raises the temperature of the water. The uncondensed steam or other gaseous heating medium passes upward around the outside of the tubes 7 to the outlet 100 above in the top of the heater.

Mounted below the feed tubes is a horizontally disposed series of receiving pans 9, 10 and 11, securely held within the heater, and having the middle pan 11 placed below the level of the other pans and communicating through an aperture 12 with a pipe 13 which is vertically disposed, and which leads the water to the lower part of the shell of the heater into a chamber 14. The top of this chamber is formed by perforated plates 15 and a second chamber 16 is formed between this plate and an upper perforated plate 17. In the chamber 16 is placed a supply of filtering material. The water passing into the chamber 14 by way of the pipe 13 rises from said chamber through the filtering material and the perforated plates and is thus cleansed of mechanical impurities. The filtered water then passes out of the heater through a valve controlled outlet pipe 18, the upper end of which is slightly above the plate 17. The controlling valve (not shown) of the pipe 18 is usually in the connecting pipe which leads from said pipe 18 to the boiler. In case the filtering material should become clogged up through neglect or any other cause, so that the heated water could not flow upward through it, as above described, the water would gradually fill up pipe 13 until it overflowed direct into the chamber above the filter bed, thus avoiding the filter chamber and passing directly to the outlet.

Extending above the upper perforated plate 17 is the float 19 of a suitable regulating valve controlling mechanism. This mechanism consists of a rod 91 carrying the float and secured at its outer end to the shaft 20, which is journaled in bearing 21 on the end wall of the shell. The other end of the shaft 20 has a crank arm 22, pivoted to the lower end of an adjustable link 23, the upper end of which is connected to and is adapted to operate a valve (not shown) mounted in the valve casing 2.

The body of water in the lower part of the apparatus normally assumes a level such as indicated approximately by the dotted line $x$—$x$ in Fig. 1. The closing of the valve (not shown) in the pipe connected to the boiler causes the water to back-up in the pipe 18 and the lower part of the heater until it reaches the level indicated, at which time the float 19 will so actuate the inlet valve in the casing 2 as to prevent a further supply of cold water from entering the apparatus. On the other hand, as the valve in the pipe leading to the boiler is opened to admit hot water to the boiler, the level in the heater falls, allowing the float 19 to drop to a certain extent and causing the inlet valve of the heater to be opened to such an extent as to replace the water which has been removed. This arrangement automatically insures the admission to the heater of an amount of water proportionate to the demand.

In this invention, the procedure, broadly stated, may be said to consist of the steps of first bringing a continuously supplied body of water of considerable volume into contact with the heated surface of a solid conducting body, then leading the said water in a thin film or sheet again over a heated solid, preferably over a surface heated by the same source of heat employed for the initial step, and finally bringing the water while in a finely divided state into contact with the gaseous heated body, whether steam or heated air, employed to impart the heat to the conducting surfaces before mentioned. In such a process, it is clear that the water will be quickly heated without retarding the flow of the water, and with a minimum waste of heat. The primary advantages are that the water is finely divided without retarding the flow of same, that by the time it is finely divided it has already absorbed a large quantity of heat, and that the preliminarily heated, fine particles of water are then ready for the absorption of an extreme degree of heat by individual contact with the particles of steam.

In so far as I am aware, I am the first to provide a water heating chamber in the form of a hollow body having a reëntrant wall dividing said body into steam and water chambers respectively both having elongated longitudinally arranged outlet openings, and inlet openings at one end, said inlet openings being at opposite ends of the body. By making the outlet opening of the steam chamber of narrow elongated form and providing the edges of said opening with lips or flanges to break into spray the sheets of water passing over the body at opposite sides, the steam will issue from the body in a narrow sheet immediately between and in contact with the opposite sprays of water, through which sprays the steam is thoroughly disseminated in order to heat the water while it is in finely divided condition. It is also important to note that the films of water passing over the body 7 are broken or disrupted into spray immediately adjacent a restricted outlet for the steam, so that the tendency of the steam to pass entirely through the water spray is augmented.

It is clear that various changes in the details of this apparatus may be made without departing from the principle of my invention.

Having thus described my invention, what I claim is:—

1. In a feed water heater, a hollow elongated body having a reëntrant wall dividing said body into a water chamber and a steam chamber, both of said chambers having inlets and elongated longitudinally directed outlets; substantially as described.

2. In a feed water heater, a hollow body having a reëntrant wall dividing it into a steam chamber and a water chamber, each of said chambers having an end inlet, and a restricted outlet directed lengthwise of the body; substantially as described.

3. In a feed water heater, a hollow elongated body having a reëntrant wall dividing it into a steam chamber and a water chamber, each of said chambers having an end inlet, and a restricted elongated outlet directed lengthwise of the body, said inlets being arranged at opposite ends of said body, and the other ends of the chambers being closed; substantially as described.

4. In a feed water heater, a hollow body having a reëntrant wall dividing it into a water chamber open at the top and a steam chamber open at the bottom, and means to break or disrupt the films of water overflowing from the water chamber, at points immediately adjacent the steam outlet; substantially as described.

5. In a feed water heater, a hollow body having a wall dividing it into a water chamber open at the top and a steam chamber open at the bottom, said chambers having end inlets, and means to break or disrupt the films of water overflowing from the water chamber, along the edges of the steam outlet; substantially as described.

6. In a feed water heater, a hollow body having a reëntrant wall dividing it into an upper water chamber and a lower steam chamber, the water chamber being open at the top and the steam chamber having a narrow elongated longitudinally directed steam outlet at the bottom, said body being provided with flanges adjacent said steam outlet; substantially as described.

7. In a feed water heater, a hollow body, means dividing said body into water and steam chambers respectively, each of said chambers having an end inlet and a longitudinally directed outlet, and flanges on the body extending along the side edges of one of said outlets; substantially as described.

8. In a feed water heater, a hollow body of tubular form having a reëntrant wall creating a water chamber eccentric to the body, the remainder of the interior of the body serving as a steam chamber, both of said chambers having narrow elongated openings directed lengthwise of the body; substantially as described.

9. In a feed water heater, a hollow tubular body having oppositely arranged elongated openings in the wall thereof, and an interior wall creating a separate chamber in the body which is in communication with one of said openings but cut off from communication with the other opening; substantially as described.

10. In a feed water heater, an elongated tubular body having oppositely arranged elongated openings in its curved wall, and a wall dividing the interior of said body into separate chambers one of which is eccentric to the body and in communication with one of said openings; substantially as described.

11. In a feed water heater, a tubular body having oppositely arranged openings in its curved wall, and a wall dividing the interior of said body into separate chambers one of which is eccentric to the body and in communication with one of said openings, said body having flanges along the edges of the other opening; substantially as described.

12. In a feed water heater, a tubular body having oppositely arranged openings in its curved wall, and a wall dividing the interior of said body into separate chambers one of which is eccentric to the body and in communication with one of said openings, said chambers each having an end opening, and said end openings of the respective chambers being located at opposite ends of the body; substantially as described.

In witness whereof I have hereunto set my hand on the 28th day of April, 1911.

JOHN HICKEY.

Witnesses:
 THOMAS HEWES,
 SAMUEL H. FISHER.

---

Copies of this patent may be obtained for five cents each, by addressing the "Commissioner of Patents, Washington, D. C."